US008319761B2

(12) United States Patent
Lee et al.

(10) Patent No.: US 8,319,761 B2
(45) Date of Patent: Nov. 27, 2012

(54) ORGANIC LIGHT EMITTING DISPLAY AND DRIVING METHOD THEREOF

(75) Inventors: Wang-jo Lee, Suwon-si (KR); Bo-yong Chung, Suwon-si (KR); Sang-moo Choi, Suwon-si (KR); Hyung-soo Kim, Suwon-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 1160 days.

(21) Appl. No.: 12/219,602

(22) Filed: Jul. 24, 2008

(65) Prior Publication Data

US 2009/0027369 A1 Jan. 29, 2009

(30) Foreign Application Priority Data

Jul. 27, 2007 (KR) ........................ 10-2007-0075555

(51) Int. Cl.
*G06F 3/038* (2006.01)
*G09G 3/30* (2006.01)

(52) U.S. Cl. .......................................... 345/204; 345/76

(58) Field of Classification Search .............. 345/64–81, 345/100
See application file for complete search history.

(56) References Cited

U.S. PATENT DOCUMENTS 7,221,197 B2 5/2007 Morita
2005/0116918 A1* 6/2005 Shin ............................. 345/100
2005/0243034 A1* 11/2005 Chung et al. .................... 345/76
2005/0259052 A1 11/2005 Shin
2005/0259490 A1* 11/2005 Eom ............................ 365/221
2006/0107143 A1 5/2006 Kim et al.
2006/0107146 A1 5/2006 Kim et al.
2006/0139255 A1 6/2006 Kim et al.
2007/0139111 A1* 6/2007 Huang .......................... 330/253

FOREIGN PATENT DOCUMENTS

KR 10-2005-0105388 A 11/2005
KR 10-2005-0109372 A 11/2005
KR 10-2006-0015812 A 2/2006
KR 10-2006-0018766 A 3/2006
KR 10-2006-0032829 A 4/2006
KR 10-2006-0053199 A 5/2006

* cited by examiner

*Primary Examiner* — Alexander Eisen
*Assistant Examiner* — Mark Regn
(74) *Attorney, Agent, or Firm* — Lee & Morse, P.C.

(57) ABSTRACT

An organic light emitting display configured to be driven using a frame divided into a plurality of sub-frames includes a data driver configured to supply a plurality of data signals to output lines during a first period of one horizontal period of the sub-frame, a scan driver configured to sequentially supply a scan signal to scan lines during a second period of the one horizontal period of the sub-frame, a demultiplexer coupled to each output line, the demultiplexer being configured to supply the data signals to a plurality of data lines, buffers configured to supply buffers supplying signals from the demultiplexers to the data lines, the buffers including PMOS transistors, and pixels disposed at intersections of the scan lines and the data lines, the pixels being configured to display images corresponding to the data signals.

17 Claims, 8 Drawing Sheets

ORGANIC LIGHT EMITTING DISPLAY AND DRIVING METHOD THEREOF

BACKGROUND OF THE INVENTION

1. Field of the Invention

Embodiments of the present invention relate to an organic light emitting display and a driving method thereof. More particularly, embodiments of the present invention relate to an organic light emitting display and a method for driving the same, which is applicable to a digital drive.

2. Description of the Related Art

Recently, various flat panel displays having reduced weight and volume compared with cathode ray tubes (CRT) have been developed. Flat panel displays include liquid crystal displays (LCDs), field emission displays (FEDs), plasma display panels (PDPs), and organic light emitting displays.

Organic light emitting displays make use of organic light emitting diodes (OLEDs) that emit light by re-combining electrons and holes. The organic light emitting display may provide high response speed and small power consumption.

The OLED generates light of a predetermined luminance corresponding to a current from a pixel circuit receiving power from a first power supply. Typically, an anode of the OLED is coupled to the pixel circuit and a cathode thereof is coupled to a second power supply. To control the current, the pixel circuit typically includes a transistor between the first power supply and the OLED, and a storage capacitor between a gate electrode and a first electrode of the transistor.

Thus, pixels of the conventional organic light emitting display express gradations using a voltage stored in the storage capacitor. However, exact expression of desired gradations may not be realized. In practice, it may be difficult to accurately express a brightness difference between adjacent gradations using analog driving noted above.

Further, transistors in the pixel circuits may have differing threshold voltages and electron mobilities due to a process deviation. Thus, the pixels may generate light of different gradations with respect to the same gradation voltage, resulting in non-uniform luminance.

SUMMARY OF THE INVENTION

Embodiments are therefore directed to an organic light emitting display and a method for driving the same, which substantially overcome one or more of the problems due to the limitations and disadvantages of the related art.

It is therefore a feature of an embodiment of the present invention to provide an organic light emitting display and a method for driving the same, which uses buffers to improve drive performance.

It is a therefore another feature of an embodiment of the present invention to provide an organic light emitting display and a method for driving the same, using a buffer including a PMOS transistor for each demultiplexer in a digital drive.

At least one of the above and other features and advantages of the present invention may be realized by providing an organic light emitting display configured to be driven using a frame divided into a plurality of sub-frames, the organic light emitting display including a data driver configured to supply a plurality of data signals to output lines during a first period of one horizontal period of the sub-frame, a scan driver configured to sequentially supply a scan signal to scan lines during a second period of the one horizontal period of the sub-frame, a demultiplexer coupled to each output line, the demultiplexer being configured to supply the data signals to a plurality of data lines, buffers supplying signals from the demultiplexers to the data lines, the buffers including PMOS transistors, and pixels disposed at intersections of the scan lines and the data lines, the pixels being configured to display images corresponding to the data signals.

Each buffer may include an input unit coupled between a first power source and a second power source, the second power source outputting a voltage less than that of the first power source, the input unit configured to control a voltage of a first output terminal coupled to an output unit in accordance with a level of a voltage supplied to an input terminal, and the output unit coupled between the first power source and the second power source, and configured to output one voltage of the first and second power sources to a second output terminal in accordance with a voltage supplied to the first output terminal.

The input unit may include a seventh transistor coupled between the first output terminal and the first power source, and configured to be driven in accordance with the voltage supplied to the input terminal, a fifth transistor coupled between the first output terminal and the second power source, a sixth transistor including a gate electrode and a second electrode coupled with the second power source, and a first electrode coupled with a gate electrode of the fifth transistor, and a second capacitor coupled between a gate electrode and a first electrode of the fifth transistor.

The input unit may include a seventh transistor coupled between the first output terminal and the first power source, and configured to be driven in accordance with the voltage supplied to the first input terminal, a fifth transistor coupled between the first output terminal and the second power source, a sixth transistor coupled between a gate electrode of the fifth transistor and the second power source, and including a gate electrode receiving a voltage having a polarity opposite to that of the voltage supplied to the first input terminal, and a second capacitor coupled between a gate electrode and a first electrode of the fifth transistor.

The output unit may include a first transistor coupled between the first power source and the second output terminal, and including a gate electrode coupled with the first output terminal, a second transistor coupled between the second output terminal and the second power source, a third transistor coupled between a gate electrode and a first electrode of the second transistor, and including a gate electrode coupled to the first output terminal, a fourth transistor coupled between the gate electrode of the second transistor and the second power source, and including a gate electrode coupled to the first input terminal, and a first capacitor coupled between the gate electrode and the first electrode of the second transistor.

The output unit may include a first transistor coupled between the first power source and the second output terminal, and including a gate electrode coupled to the first output terminal, a second transistor coupled between the second output terminal and the second power source, a fourth transistor coupled between a gate electrode of the second transistor and the second power source, and including a gate electrode coupled to the first input terminal, and a first capacitor coupled between a gate electrode and a first electrode of the second transistor.

The output unit may include a first transistor coupled between the first power source and the second output terminal, and including a gate electrode coupled to the first output terminal, a second transistor coupled between the second output terminal and the second power source, a fourth transistor including a gate electrode and a second electrode coupled to the second power source, and a first electrode coupled to a gate electrode of the second transistor, and a first capacitor coupled between a gate electrode and a first electrode of the second transistor.

The organic light emitting display may further include a demultiplexer controller configured to supply a plurality of control signals not overlapping each other so that the plurality of data signals are divided into the plurality of data lines during the first period. Each of the demultiplexers may include a plurality of switching elements, which are turned-on at different times corresponding to the plurality of control signals.

Data signals from the buffers to the data lines may be supplied to the pixels during the second period after the data signal is charged in a parasitic capacitor equivalently formed at each of the data lines.

At least one of the above and other features and advantages of the present invention may be realized by providing a method for driving an organic light emitting display in which one frame is divided in a plurality of sub-frames, the method including providing a plurality of data signals from to an output line to a plurality of data lines during a first period of one horizontal period of a sub-frame, charging parasitic capacitors equivalently formed at the data lines with the data signals through a corresponding buffer, and transferring the data signals charged in the parasitic capacitor to a pixel during a second period of the one horizontal period of the sub-frame.

The method may further include supplying a plurality of control signals not overlapping each other so that the plurality of data signals are divided into the plurality of data lines during the first period. The method may further include sequentially supplying a scan signal to scan lines during the second period.

BRIEF DESCRIPTION OF THE DRAWINGS

The above and other features and advantages will become more apparent to those of ordinary skill in the art by describing in detail exemplary embodiments thereof with reference to the attached drawings, in which.

DETAILED DESCRIPTION OF THE INVENTION

Figure 1:
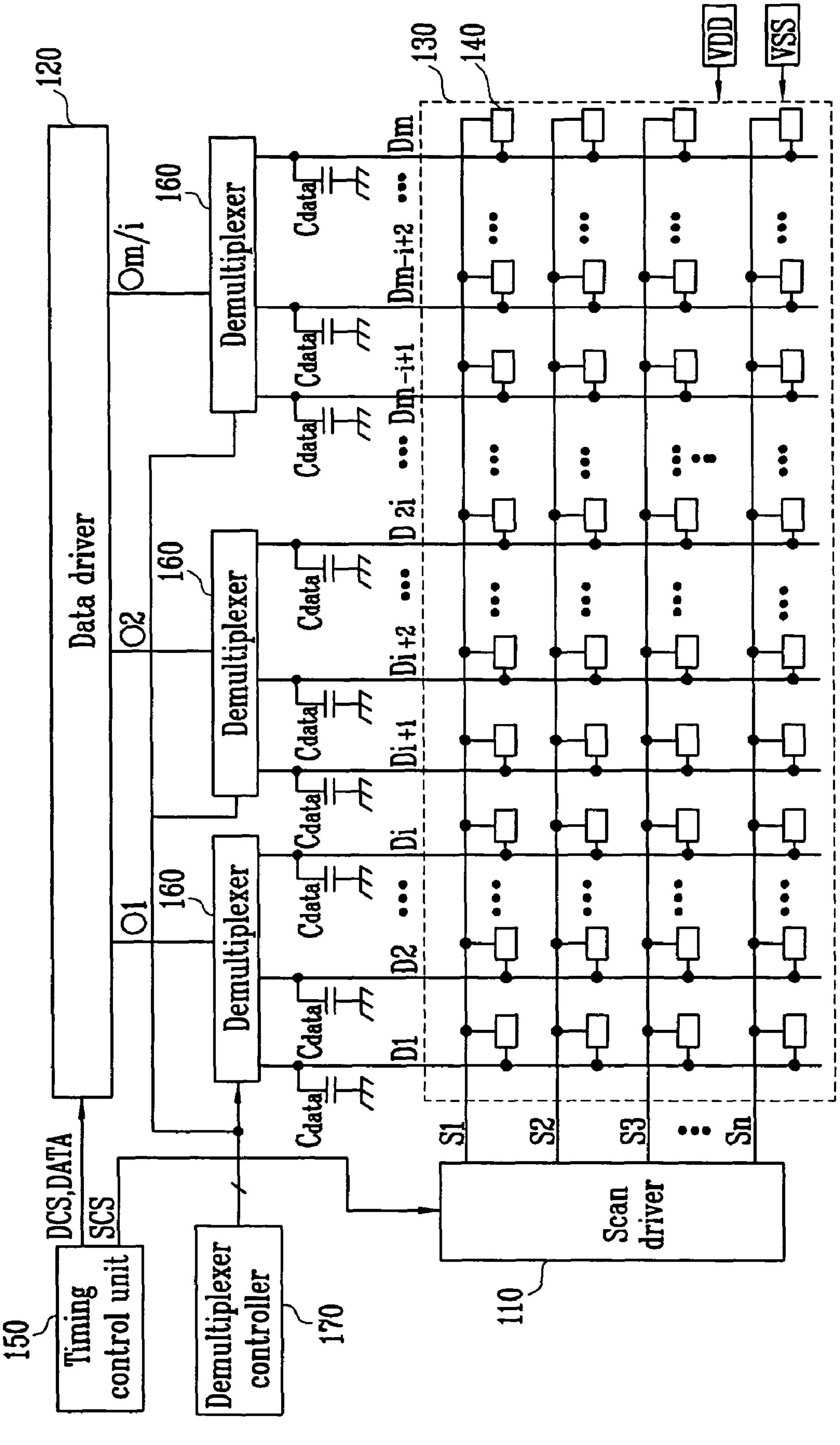
FIG. 1 illustrates an organic light emitting display according to a first embodiment of the present invention.

Korean Patent Application No. 10-2007-0075555, filed on Jul. 27, 2007, in the Korean Intellectual Property Office, and entitled: "Organic Light Emitting Display and Driving Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Here, when a first element is described as being coupled to a second element, the first element may be not only directly coupled to the second element but may also be indirectly coupled to the second element via a third element. Further, elements that are not essential to the complete understanding of the invention may be omitted for clarity. Also, like reference numerals refer to like elements throughout.

Hereinafter, exemplary embodiments of the present invention will be described with reference to FIG. 1 to FIG. 9.

FIG. 1 illustrates an organic light emitting display according to an embodiment of the present invention With reference to FIG. 1, the organic light emitting display according to an embodiment of the present invention may include a scan driver 110, a data driver 120, a pixel portion 130, a timing control unit 150, demultiplexers 160, a demultiplexer controller 170, and data capacitors Cdata, i.e., parasitic capacitors on data lines.

The timing control unit 150 may generate a data driving signal DCS and a scan driving signal SCS corresponding to external synchronizing signals. The data driving signal DCS generated from the timing control unit 150 may be provided to the data driver 120, and the scan driving signal SCS may be provided to the scan driver 110. Further, the timing control unit 150 may provide externally supplied data DATA to the data driver 120.

The data driver 120 may sequentially provide a plurality of data signals to respective output lines O1 to Om/i, where i is a natural number greater than two, every horizontal period of a plurality of sub-frame periods included in one frame. For example, when each of the demultiplexers 160 is coupled to three data lines D, respectively, the data driver 120 may sequentially provide three data signals to the respective output lines O1 to Om/i every horizontal period of a sub-frame period.

The pixel portion 130 includes a plurality of pixel circuits 140 coupled to respective scan lines S1 to Sn and data liens D1 to Dm. Each of the data signals supplied to the data lines D1 to Dm may be divided into a first data signal, which causes an OLED connected to a pixel circuit 140 to emit light, and a second data signal, which causes the OLED connected to the pixel circuit 140 not to emit light. The first data signal or the second data signal may function to control emission or non-emission of the OLED connected to the pixel circuits 140. Namely, the data driver 120 may provide the first data signal or the second data signal to the output lines O1 to Om/i every horizontal period of respective sub-frame periods.

The scan driver 110 may sequentially provide a scan signal to the scan lines S1 to Sn every horizontal period of the sub-frame period. When the scan signal is supplied to the scan lines S1 to Sn, the pixel circuits 140 are selected by scan lines S1 to Sn receiving the scan signal, and the selected pixel circuits 140 receive the first data signal or the second data signal from the data lines D1 to Dm.

The pixel portion 130 may receive a voltage of a first power supply VDD and a voltage of a second power supply VSS from the exterior, and may provide the voltage to the pixel circuits 140. When the pixels 140 receive the voltage of the first power supply VDD and a voltage of the second power supply VSS, and the scan signal is supplied, the pixel circuits 140 receive a data signal (the first data signal or the second data signal), and emit light or not according to the data signal.

Demultiplexers 160 may be coupled to each output line O1 to Om/i. The demultiplexers 160 may also be coupled to i data lines D, and may provide i data supplied to the output lines O1 to Om/i to the i data lines D. In other words, the demultiplexers 160 may separately provide i data supplied to the output lines O1 to Om/i to the i data lines D, reducing a number of outputs needed in the data driver 120. For example, assuming that ‘i’ is 3, the number of output lines O may be reduced by up to about ⅓ compared with a configuration that does not use demultiplexers.

The demultiplexer controller 170 may supply i control signals to each demultiplexer 160 during a horizontal time period so that i data signals to be supplied to the output line O are divided and supplied into i data lines D. Here, the demultiplexer controller 170 may sequentially provide the i controls signals such that they do no overlap each other during the horizontal time period, allowing the data signals may be stably supplied. FIG. 1 illustrates the demultiplexer controller 170 as being separate from the timing control unit 150. However, embodiments are not limited thereto. For example, the demultiplexer controller 170 may be integrated with the timing control unit 150.

The parasitic data capacitor Cdata may be present at each data line D1 to Dm. In other words, the parasitic data capacitors Cdata are not additional capacitors, but are inherent in the data lines, and are merely illustrated for clarity of operation. Data capacitors Cdata may temporarily store the data signal to be supplied to the data lines D1 to Dm, which, in turn, provide the stored data signal to the pixels 140.

Figure 2:
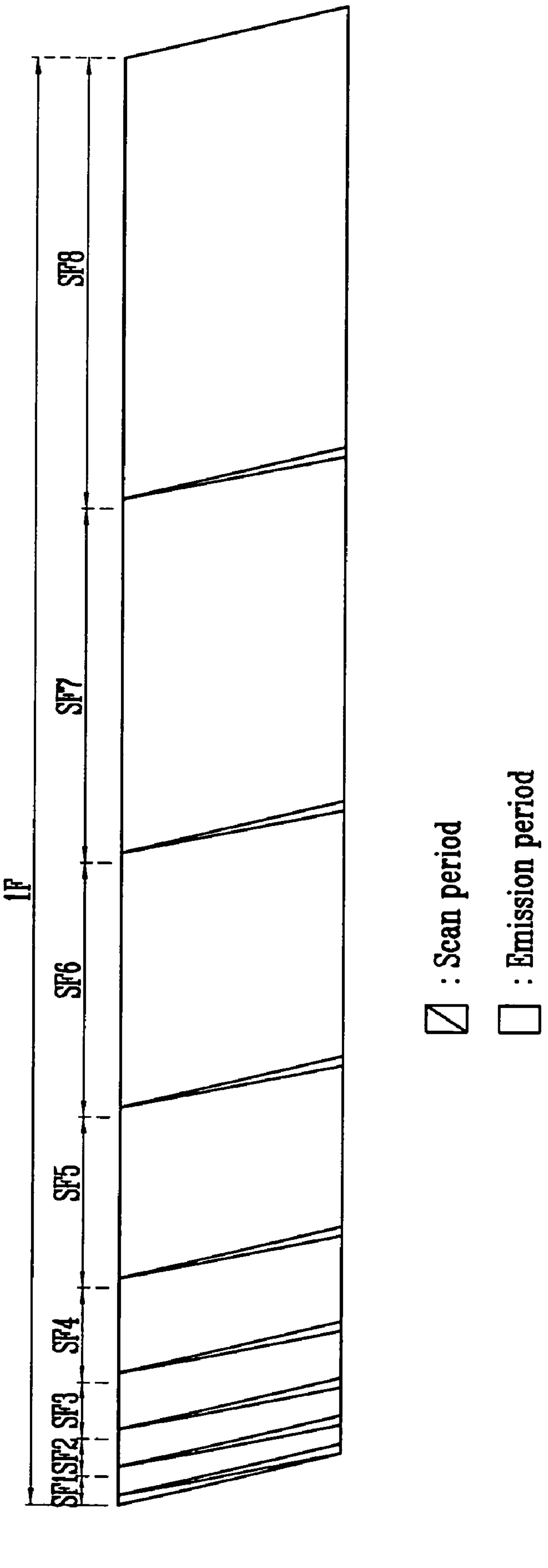
FIG. 2 illustrates one frame in an organic light emitting display according to an embodiment of the present invention.

FIG. 2 illustrates one frame in an organic light emitting display according to an embodiment of the present invention. Hereinafter, for convenience of description, it is assumed that three data lines are coupled to each demultiplexer 160, i.e., i=3.

During the scan period, the scan signal may be sequentially provided to the scan lines S1 to Sn. Further, three data signals may be sequentially provided to each output line O during one horizontal time period when the scan signal is supplied. The three data signals supplied to each output line O may be separated by the demultiplexers 160, and the separated data signals, i.e., the first data signal or the second data signal, may be supplied to corresponding three data lines D. That is, the pixels 140 having received the scan signal, receive the first data signal or the second data signal.

During the emission period, the pixels 140 emit light or not according to the first data signal or the second data signal supplied during the scan period. That is, the pixels 140 having received the first data signal during the scan period are set in an emission state during a sub-frame period, while pixels 140 having received the second data signal are set in a non-emission state during the sub-frame period.

To express a predetermined gradation, different emission periods may be set to the respective sub-frames SF1 to SF8. For example, in order to express an image of a 256 gradation level, as illustrated in FIG. 2, one frame is divided into eight sub-frames SF1 to SF8. Further, the duration of the emission periods in the eight sub-frames SF1 to SF8 are increased at a rate of $2^n$ (n=0, 1, 2, 3, 4, 5, 6, 7). That is, images of a predetermined gradation may be displayed while controlling an emission or a non-emission of the pixels 140 in the respective sub-frames. In other words, a predetermined gradation during one frame period may be expressed using a sum of emission times of a pixel during a sub-frame period.

The frame illustrated in FIG. 2 is just one example of an embodiment, and embodiments of the present invention are not limited thereto. For example, one frame may be divided into more than ten sub-frames, and various emission periods of each sub-frame may be set by a designer. In addition, a reset period may be further included in each sub-frame to set the pixels 140 in an initial state.

Since the aforementioned digital drive expresses gradations using emission times of pixels, desired gradations may be more exactly expressed. In other words, since the gradations are expressed by using emission time, rather than by division of a constant voltage, more exact gradations may be expressed. Furthermore, because gradations may be expressed using turning-on and turning-off states of transistors included each pixel, an image of uniform luminance may be displayed regardless of non-uniformity of the transistors.

Figure 3:
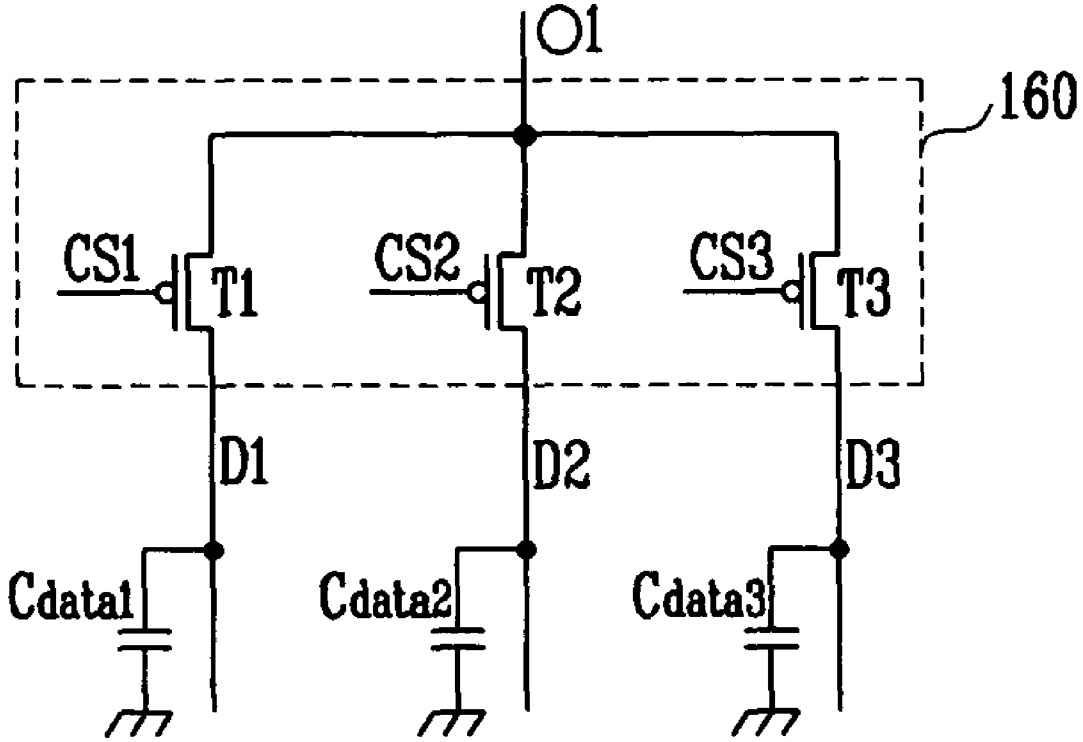
FIG. 3 illustrates a circuit diagram of a demultiplexer shown in FIG. 1.

FIG. 3 illustrates a circuit diagram of an embodiment of the demultiplexer 160 shown in FIG. 1. For convenience, FIG. 3 illustrates an embodiment of the demultiplexer 160 coupled to a first output line O1. With reference to FIG. 3, each demultiplexer 160 may include a first switching element (or transistor) T1, a second switching element T2, and a third switching element T3.

The first switching element T1 may be coupled between the first output line O1 and a first data line D1. When a first control signal CS1 from the demultiplexer controller 170 is supplied to the first switching element T1, the first switching element T1 is turned-on to provide the data signal supplied to the first output line O1 to the first data line D1. Accordingly, the data signal may be supplied to the pixel 140, which is coupled to the first data line D1 and a j-th scan line Sj.

The second switching element T2 may be coupled between the first output line O1 and a second data line D2. When a second control signal CS2 from the demultiplexer controller 170 is supplied to the second switching element T2, the second switching element T2 is turned-on to provide the data signal supplied to the first output line O1 to the second data line D2. Accordingly, the data signal may be supplied to the pixel 140, which is coupled to the second data line D2 and the j-th scan line Sj.

The third switching element T3 may be coupled between the first output line O1 and a third data line D3. When a third control signal CS3 from the demultiplexer controller 170 is supplied to the third switching element T3, the third switching element T3 is turned-on to provide the data signal supplied to the first output line O1 to the third data line D3. Accordingly, the data signal may be supplied to the pixel 140, which is coupled to the third data line D1 and the n-th scan line Sn.

That is, the demultiplexer 160 may supply data signals from one output line O1 to three data lines D1, D2, and D3, thereby reducing manufacturing cost.

When the data signal is provided from the demultiplexer 160 to the data lines D1, D2, and D3, a delay may occur due to capacitances of the parasitic capacitors Cdata1, Cdata2, and Cdata3. Accordingly, the organic light emitting display may include buffers for each data line.

Figure 4:
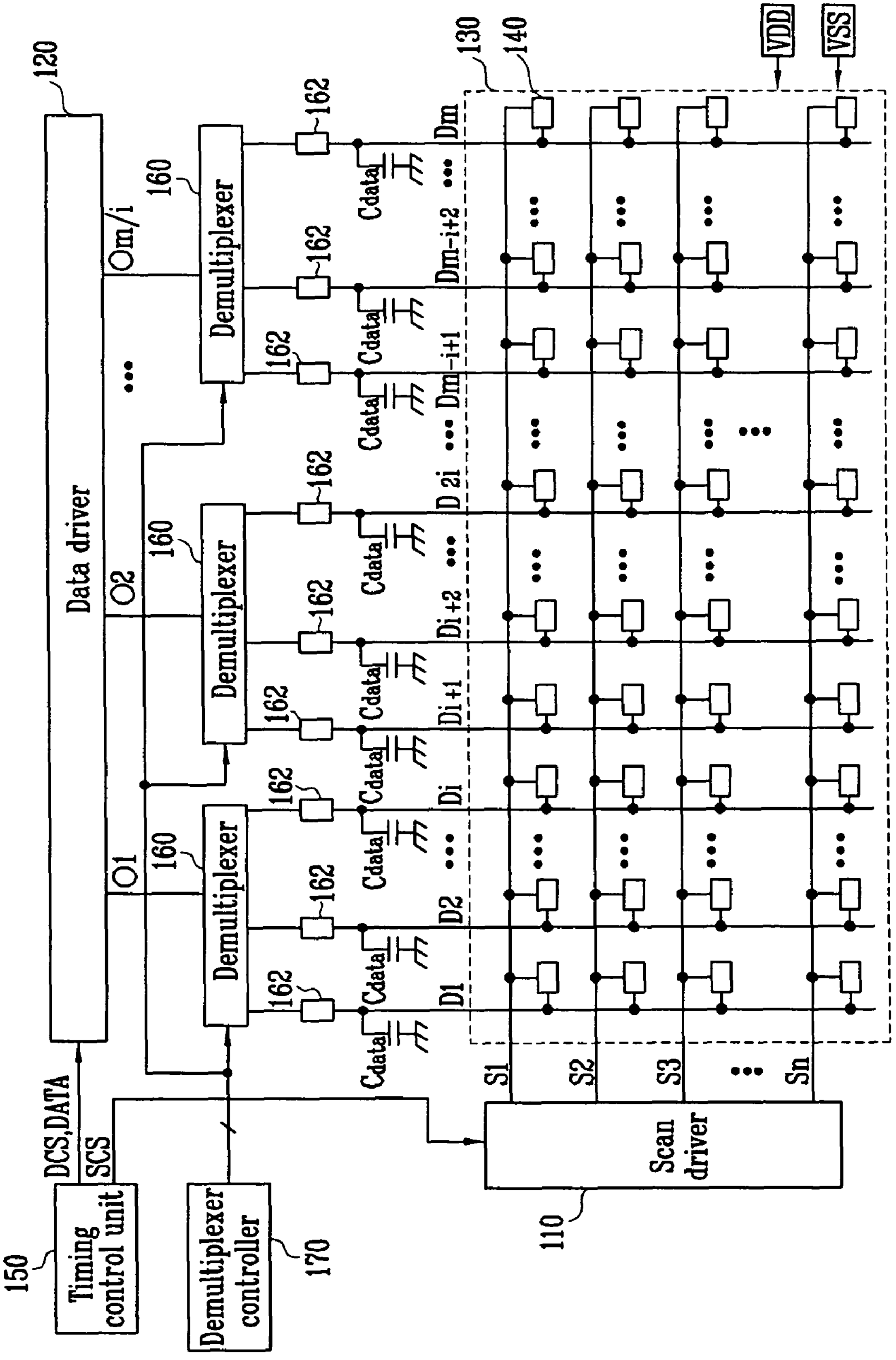
FIG. 4 illustrate details of the organic light emitting display shown in FIG. 1.

FIG. 4 illustrates details of an organic light emitting display shown in FIG. 1. Elements of FIG. 4 corresponding to those of FIG. 1 are designated by the same symbols, and the description may be omitted for clarity.

Referring to FIG. 4, the organic light emitting display may include a buffer 162 may be additionally provided between the demultiplexer 160 and each data line D. The demultiplexer 160 separately provides a plurality of data signal from an output line.

The buffer 162 transfers a data signal from the demultiplexer 160 to the data line D having the parasitic data capacitor Cdata. Because the data signal from the demultiplexer 160 is provided through the buffer 162, a delay may be minimized.

Further, when the data signal is supplied through the buffer 162, voltage loss may be minimized, enhancing drive performance.

The parasitic data capacitor Cdata may temporarily store the data signal supplied from the buffer 162. The parasitic data signal stored in the data capacitor Cdata may be provided to a pixel selected by a scan signal.

Figure 5:
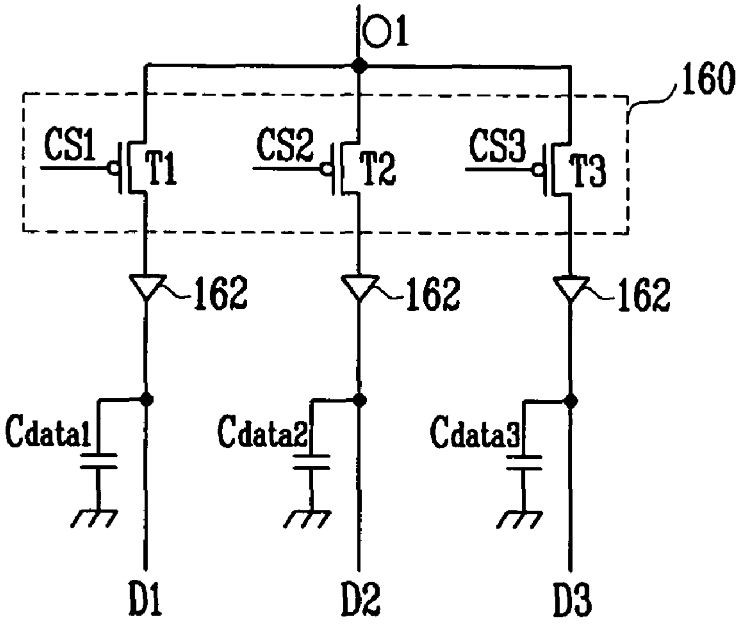
FIG. 5 illustrates details of the demultiplexer and the buffer shown in FIG. 4.
Figure 6:
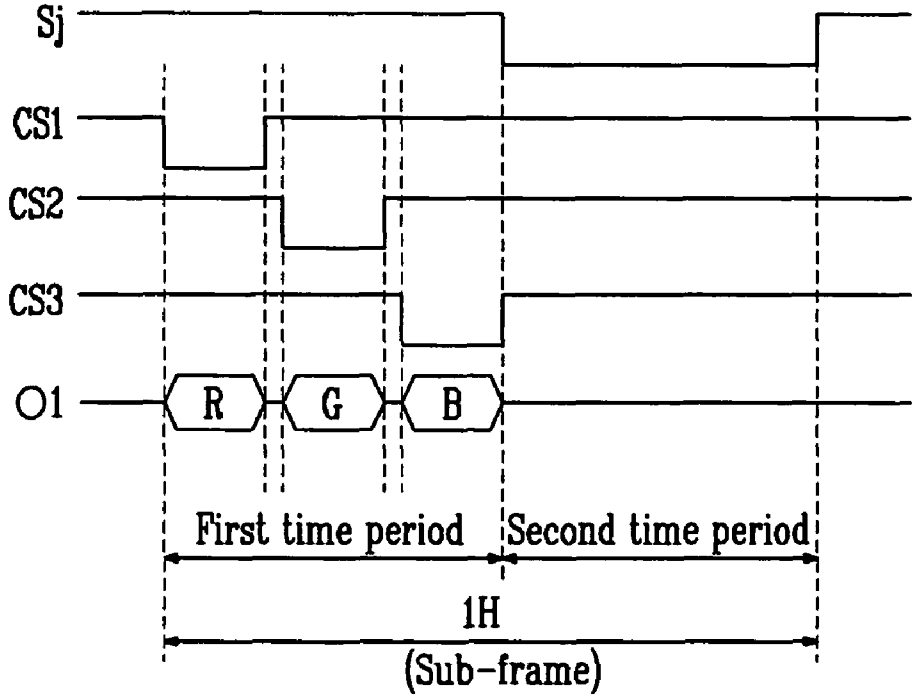
FIG. 6 illustrates drive waveforms supplied to the demultiplexer shown in FIG. 5.

FIG. 5 illustrates the demultiplexer 160 and the buffer 162 illustrated in FIG. 4. FIG. 6 illustrates a drive waveform supplied to the demultiplexer 160 illustrated in FIG. 5. For convenience of the explanation, FIG. 5 and FIG. 6 illustrate the demultiplexer 160 coupled to the first output line O1. With reference to FIG. 5 and FIG. 6, each buffer 162 may be coupled to respective ones of switching elements T1, T2, and T3 in the demultiplexer 160. The buffers 162 may be constructed by PMOS transistors. A detailed construction of the buffers 162 will be provided below.

The following is an explanation of an operation of the buffers 162. The first control signal CS1 to the third control signal CS3 may be sequentially supplied during a first period of one horizontal period 1H in a sub-frame.

When the first control signal CS1 is supplied, the first switching element T1 is turned-on. When the first switching element T1 is turned-on, a first data signal, e.g., a red data signal R, supplied to the output line O1 is provided to the first parasitic data capacitor Cdata1 through the buffer 162. Accordingly, the first parasitic data capacitor Cdata1 is charged with a voltage corresponding to the red data signal R. Here, because the red data signal R is supplied to the parasitic first data capacitor Cdata1 through the buffer 162, voltage loss and delay may be minimized.

When the second control signal CS2 is supplied, the second switching element T2 is turned-on. When the second switching element T2 is turned-on, a second data signal, e.g., a green data signal G, supplied to the output line O1 is provided to the second parasitic data capacitor Cdata2 through the buffer 162. Accordingly, the second data capacitor Cdata2 is charged with a voltage corresponding to the green data signal G. Here, because the green data signal G is supplied to the second data capacitor Cdata2, voltage loss and delay may be minimized.

When the third control signal CS3 is supplied, the third switching element T3 is turned-on. When the third switching element T3 is turned-on, a third data signal, e.g., a blue data signal B, supplied to the output line O1 is provided to the third parasitic data capacitor Cdata3 through a buffer 162. Accordingly, the third data capacitor Cdata3 is charged with a voltage corresponding to the blue data signal B. Here, because the blue data signal B is supplied to the third parasitic data capacitor Cdata3 through the buffer 162, voltage loss and delay may be minimized.

Next, a scan signal may be supplied to a scan line Sn during a second period. When the scan signal is supplied to the scan line Sn, voltages charged in the first, second, and third data parasitic capacitors Cdata1, Cdata2, and Cdata3 are supplied to pixels 140 coupled to the scan line Sn. Accordingly, the pixels 140 are set in an emission or non-emission state during a predetermined period corresponding to the data signal.

Figure 7:
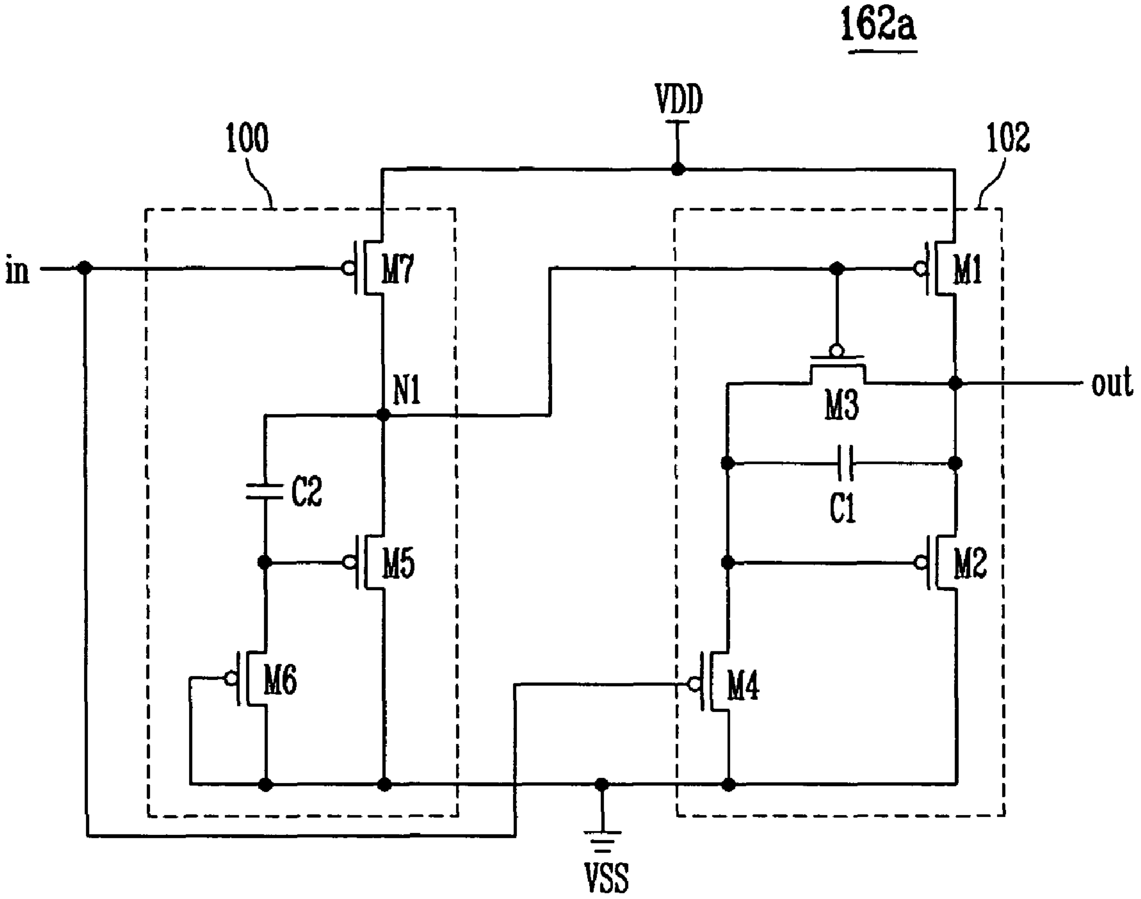
FIG. 7 illustrates a first example embodiment of the buffer shown in FIG. 4.

FIG. 7 illustrates a first example embodiment of the buffer 162 illustrated in FIG. 5. With reference to FIG. 7, a buffer 162*a* of the first example embodiment of the present invention may include an input unit 100 and an output unit 102. Transistors M1 to M7 included in each of the input unit 100 and the output unit 102 may each be PMOS transistors.

The output unit 102 may output a high or low voltage to an output terminal out, i.e., a second output terminal, corresponding to a high voltage from the first power source VDD or a low voltage from the second power source VSS. The output unit 102 may receive a high or low voltage from a first output terminal of the input unit 100 according to a voltage input to an input terminal in of the input unit 100.

The output unit 102 may include a first transistor M1, a second transistor M2, a third transistor M3, a first capacitor C1, and a fourth transistor M4. The first transistor M1 may be coupled between the first power source VDD and the output terminal out. The second transistor M2 may be coupled between the output terminal out and the second power source VSS. The third transistor M3 may be coupled between a gate electrode and a first electrode of the second transistor M2. The first capacitor C1 may be coupled between the gate electrode and the first electrode of the second transistor M2 parallel with the third transistor M3. The fourth transistor M4 may be coupled between the gate electrode of the second transistor M2 and the second power source VSS.

The gate electrode of the first transistor M1 may be coupled to the first output terminal, i.e., a first node N1, of the input unit 100, and a first electrode thereof may be coupled to the first power source VDD. A second electrode of the first transistor M1 may be coupled to the output terminal out. The first transistor M1 may be turned on/off according to a voltage supplied from the first output terminal of the input unit 100 to control an electrical coupling between the output terminal out and the first power source VDD.

The gate electrode of the second transistor M2 may be coupled with a first electrode of the fourth transistor M4, one terminal of the first capacitor C1, and a second electrode of the third transistor M3. A first electrode of the second transistor M2 may be coupled to the output terminal out, and a second electrode thereof may be coupled to the second power source VSS. The second transistor M2 may be turned on/off according to a voltage applied to the gate electrode thereof to control an electrical coupling between the output terminal out and the second power source VSS.

The first capacitor C1 may be coupled between the first electrode and the gate electrode of the second transistor M2. The first capacitor C1 may be charged with a voltage between the gate electrode and the first electrode of the second transistor M2. The first capacitor C1 may be omitted in this configuration.

The gate electrode of the third transistor M3 may be coupled to the first output terminal of the input unit 100, and a first electrode thereof may be coupled to the first electrode of the first transistor M1. Further, the second electrode of the third transistor M3 may be coupled with the gate electrode of the second transistor M2. The third transistor M3 may be turned on/off simultaneously with the first transistor M1 to control a voltage supplied to the gate electrode of the second transistor M2.

A gate electrode of the fourth transistor M4 may be coupled with the input terminal in, and the first electrode thereof is coupled to the gate electrode of the second transistor M2. Further, a second electrode of the fourth transistor M4 may be coupled with the second power source VSS. The fourth transistor M4 may be turned-on/off according to a voltage supplied to the input terminal in to control a voltage supplied to the gate electrode of the second transistor M2.

The input unit 100 may provide a high voltage or a low voltage to the output unit 102 according to a voltage supplied to the input terminal in.

The input unit 100 may include a seventh transistor M7, a fifth transistor M5, and a sixth transistor M6. The seventh transistor M7 may be coupled between the first power source VDD and the input terminal in. The fifth transistor M5 may be coupled between a second electrode of the seventh transistor M7 and the second power source VSS. The sixth transistor M6 may be coupled between a gate electrode of the fifth transistor M5 and the second power source VSS. The first node N1 between the second electrode of the seventh transistor M7 and a first electrode of the fifth transistor M5 may be used as the first output terminal, i.e., the output terminal of the input unit 100.

The first electrode of the fifth transistor M5 may be coupled with the first node N1, and a second electrode thereof may be coupled to the second power source VSS. The gate electrode of the fifth transistor M5 may be coupled to one terminal of the second capacitor C2. The fifth transistor M5 may be turned on/off according to a voltage applied to the gate electrode thereof.

The second capacitor C2 may be coupled between the first node N1 and the gate electrode of the fifth transistor M5. The second capacitor C2 may be charged with a voltage between the gate electrode and the first electrode of the fifth transistor M5. The second capacitor C2 may be omitted in this configuration.

A gate electrode and a second electrode of the sixth transistor M6 may be coupled with the second power source VSS, and a first electrode thereof may be coupled with the gate electrode of the fifth transistor M5. The sixth transistor M6 may be diode-connected to control the gate electrode of the fifth transistor M5.

The gate electrode of the seventh transistor M7 may be coupled with the input terminal in and a first electrode thereof may be coupled with the first power source VDD. A second electrode of the seventh transistor M7 may be coupled with the first node N1. The seventh transistor M7 may be turned-on/off according to a voltage supplied to the input terminal in.

In operation, when a high voltage is input to the input terminal in, the seventh transistor M7 and the fourth transistor M4 are turned-off. At this time, a gate electrode voltage of the fifth transistor M5 is reduced to a voltage of the second power source VSS by the sixth transistor M6 being diode-connected to turn-on the fifth transistor M5. When the fifth transistor M5 is turned-on, a voltage of the second power source VSS is supplied to the first node N1.

When the second power source VSS is supplied to the first node N1, the first transistor M1 and the third transistor M3 are turned-on. When the first transistor M1 is turned-on, a voltage of the first power source VDD is supplied to the output terminal out. When the third transistor M3 is turned-on, a voltage of the first power source VDD is input to the gate electrode of the second transistor M2 to turn-off the second transistor M2. When the second transistor M2 is turned-off, a voltage of the first power source VDD supplied to the output terminal out may be stably maintained.

When a low voltage is input to the input terminal in, the seventh transistor M7 and the fourth transistor M4 are turned-on. When the seventh transistor M7 is turned-on, a voltage of the first power source VDD is supplied to the first node N1. At this time, because the sixth transistor M6 is turned-on, the fifth transistor M5 is diode-connected. In this case, a channel rate W/L of the fifth transistor M5 may be formed to be lower than that of the seventh transistor M7, so that a voltage of the first power source VDD may be stably applied to the first node N1. When a voltage of the first power source VDD is applied to the first node N1, the first transistor M1 and the third transistor M3 are turned-off. Since the fourth transistor M4 is turned-on, a voltage of the second power source VSS is supplied to the gate electrode of the second transistor M2 to turn-on the second transistor M2. When the second transistor M2 is turned-on, a voltage of the second power source VSS is output to the output terminal out.

Since the buffer 162*a* according to the first example embodiment of the present invention is constructed of PMOS transistors, it may be formed simultaneously with the PMOS transistors included in the pixels 140. Accordingly, the buffer 162*a* may be mounted on a panel with little or no additional processes. This may suppress manufacturing costs.

Figure 8:
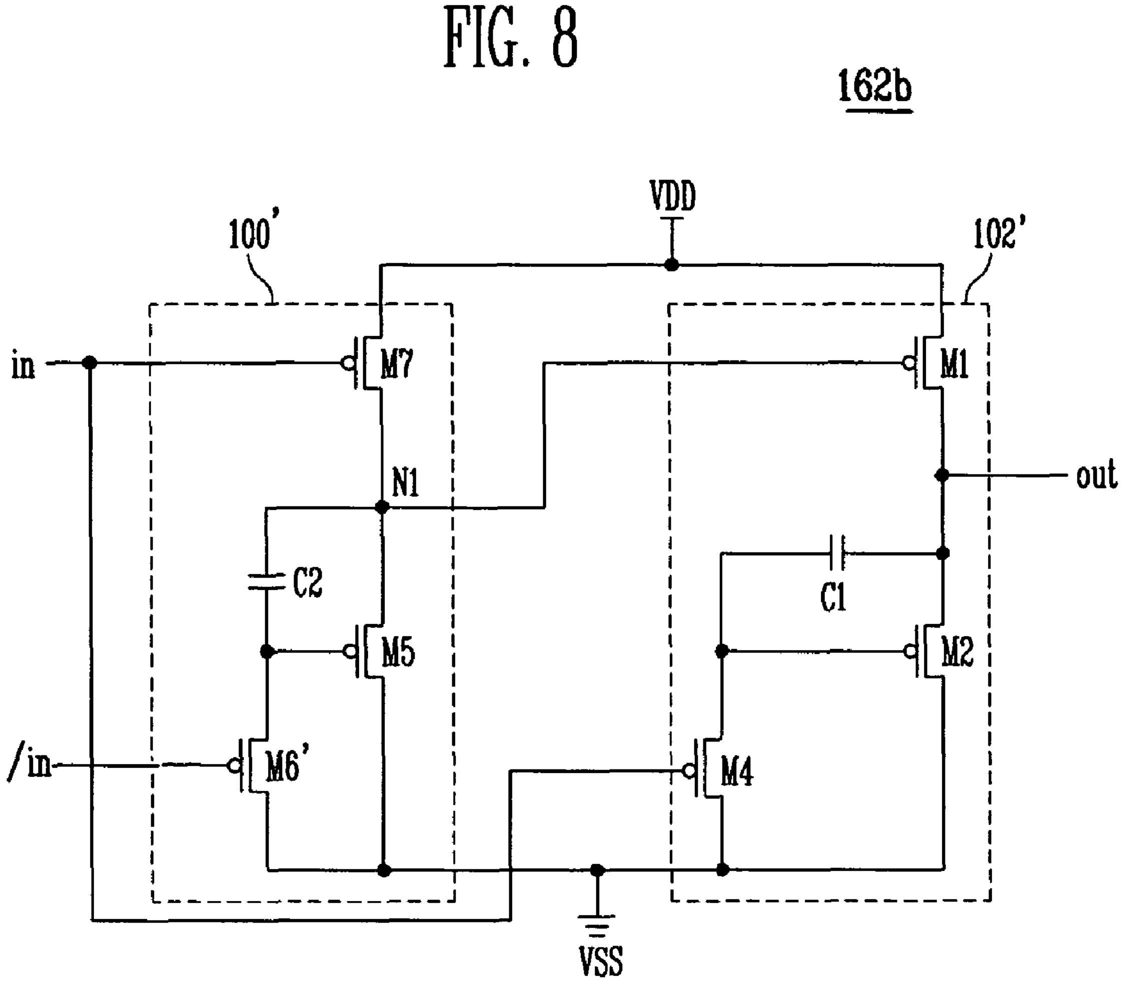
FIG. 8 illustrates a second example embodiment of the buffer shown in FIG. 4.

FIG. 8 illustrates a second example embodiment of the buffer illustrated in FIG. 5. Parts of FIG. 8 corresponding to those of FIG. 7 are designated by the same symbols and the description thereof will not be repeated. With reference to FIG. 8, a buffer 162*b* of the second example embodiment of the present invention may include an input unit 100' and an output unit 102'.

Referring to FIG. 8, in the second example of the buffer, the first capacitor C1 may be between the gate electrode and the first electrode of the second transistor M2. In other words, in the output unit 102', the third transistor M3 illustrated in FIG. 7 is removed. Further, in the input unit 100', a gate electrode of the sixth transistor M6' may be coupled with another input terminal, e.g., an input bar terminal/in. A signal supplied to the input bar terminal/in is inverted in polarity with respect to a voltage supplied to the input terminal in.

In operation, when a high voltage is input to the input terminal in, the seventh transistor M7 and the fourth transistor M4 are turned-off. At this time, a low voltage is input to the input bar terminal/in, thereby turning-on the sixth transistor M6'. When the sixth transistor M6' is turned-on, a voltage of the second power source VSS is supplied to the gate electrode of the fifth transistor M5 to turn-on the fifth transistor M5. When the fifth transistor M5 is turned-on, a voltage of the second power source VSS is supplied to the first node N1.

When a voltage of the second power source VSS is supplied to the first node N1, the first transistor M1 is turned-on. When the first transistor M1 is turned-on, a voltage of the first power source VDD is supplied to the output terminal out. When a voltage of the first power source VDD is supplied to the output terminal out, a voltage of the gate electrode of the second transistor M2 is increased accordingly by the first capacitor C1, with the result that the second transistor M2 is turned-off. When the second transistor M2 is turned-off, a voltage of the first power source VDD supplied to the output terminal out may be stably maintained.

When a low voltage is input to the input terminal in, the seventh transistor M7 and the fourth transistor M4 are turned-on. When the seventh transistor M7 is turned-on, a voltage of the first power source VDD is supplied to the first node N1. At this time, a high voltage is supplied to the input bar terminal/in to turn-off the sixth transistor M6'. In this case, a voltage at the gate electrode of the fifth transistor M5 may be increased corresponding to a voltage increase of the first node N1 by the second capacitor C2, so the fifth transistor M5 is turned-off.

When the first power source VDD is applied to the first node N1, the first transistor M1 is turned-off. At this time, because the fourth transistor M4 is turned-on, a voltage of the second power source VSS is provide to the gate electrode of the second transistor M2, thereby turning-on the second transistor M2. When the second transistor M2 is turned-on, a voltage of the second power source VSS is output to the output terminal out.

Figure 9:
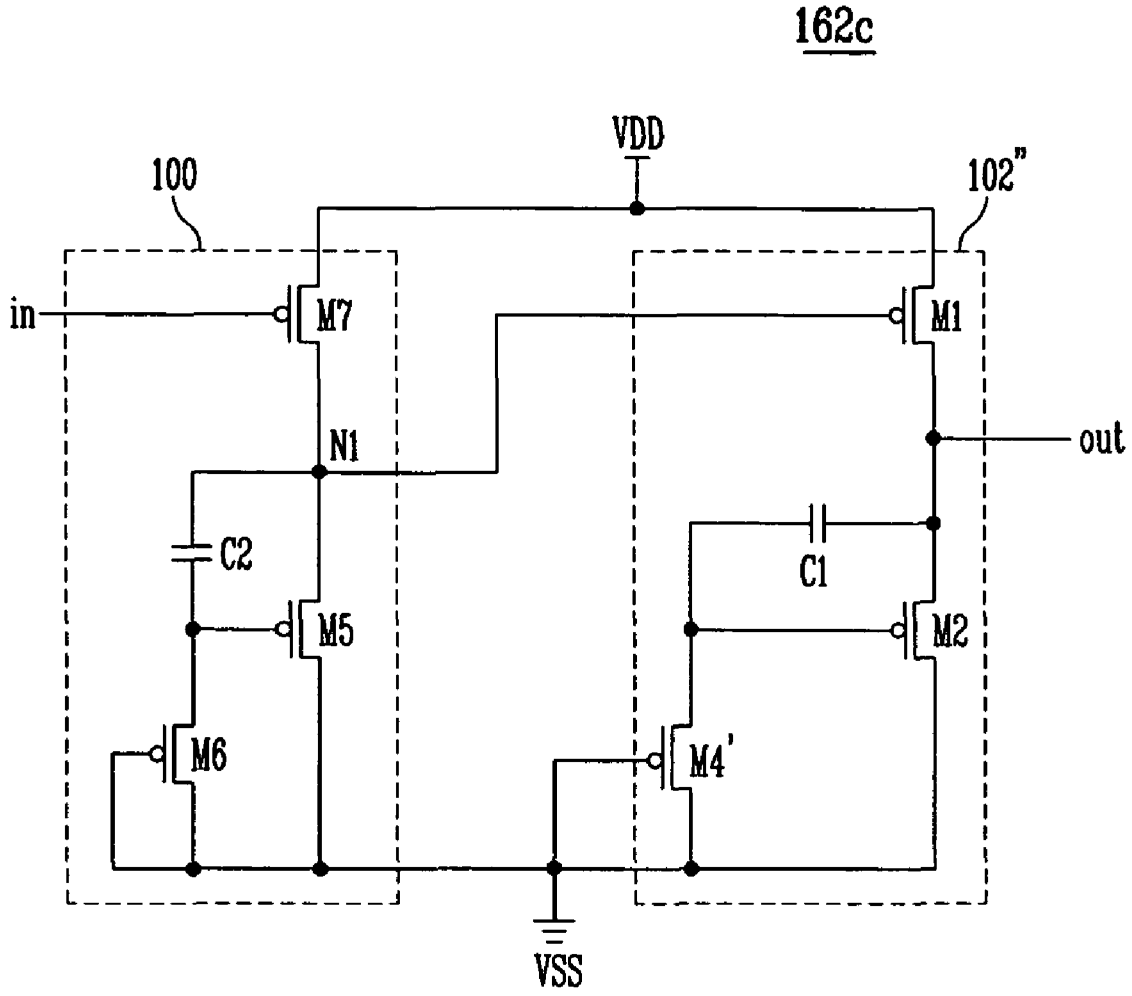
FIG. 9 illustrates a third example embodiment of the buffer shown in FIG. 4.

FIG. 9 illustrates a third example embodiment of the buffer 162 illustrated in FIG. 5. Parts of FIG. 9 corresponding to those of FIG. 7 are designated by the same symbols and the description thereof is will not be repeated. With reference to FIG. 9, a buffer 162*c* of the third example embodiment of the present invention may include the input unit 100 and an output unit 102".

Referring to FIG. 9, in the output unit 102" of the third example of the buffer 162*c*, the first capacitor C1 is only between the gate electrode and the first electrode of the second transistor M2. In other words, the third transistor M3 illustrated in FIG. 7 is removed. Further, rather than being connected to the input terminal in, a gate electrode of a fourth transistor M4' may be coupled with the second power source VSS.

In operation, when a high voltage is input to the input terminal in, the seventh transistor M7 is turned-off. Since the sixth transistor M6 diode-connected, a voltage of the gate electrode of the fifth transistor M5 is reduced to a voltage of the second power source VSS, so that the fifth transistor M5 is turned-on. When the fifth transistor M5 is turned-on, a voltage of the second power source VSS is supplied to the first node N1.

When a voltage of the second power source VSS is supplied to the first node N1, the first transistor M1 is turned-on. When the first transistor M1 is turned-on, a voltage of the first power source VDD is provided to the output terminal out. When the voltage of the first power source VDD is supplied to the output terminal out, a voltage of the gate electrode of the second transistor M2 is increased accordingly by the first capacitor C1, with the result that the second transistor M2 is turned-off. As described above, when the second transistor M2 is turned-off, the voltage of the first power source VDD supplied to the output terminal out may be stably maintained.

Meanwhile, the fourth transistor M4' is turned-on, thereby diode-connecting the second transistor M2. Accordingly, in the third embodiment, a channel rate W/L of the second transistor M2 may be formed to be lower than that of the first transistor M1, thereby stably maintaining a voltage of the first power source VDD supplied to the output terminal out.

When a low voltage is input to the input terminal in, the seventh transistor M7 is turned-on. When the seventh transistor M7 is turned-on, the voltage of the first power source VDD is provided to the first node N1. At this time, since the sixth transistor M6 is turned-on, the fifth transistor M5 is diode-connected. In this case, a channel rate W/L of the fifth transistor M5 may be formed to be lower than that of the seventh transistor M7, so that the first power source VDD may be stably applied to the first node N1.

When the first power source VDD is applied to the first node N1, the first transistor M1 is turned-off. At this time, because the fourth transistor M4 is turned-on, a voltage of the second power source VSS is supplied to the gate electrode of the second transistor M2, thereby turning-on the second transistor M2. When the second transistor M2 is turned-on, the voltage of the second power source VSS is output to the output terminal out.

As is clear from the forgoing description, in the organic light emitting display and a driving method thereof according to embodiments, since gradations are expressed in a digital drive manner, images of uniform luminance may be displayed regardless of a non-uniformity of a drive transistor included in each pixel. Furthermore, because gradations are expressed by time division, embodiments may express more exact gradations in comparison with an analog drive manner. Moreover, in embodiments, a demultiplexer may be installed for each output line, which allows manufacturing cost to be reduced. In addition, since a buffer may be provided between each demultiplexer and data line, drive performance may be improved.

Exemplary embodiments of the present invention have been disclosed herein, and although specific terms are employed, they are used and are to be interpreted in a generic and descriptive sense only and not for purpose of limitation.

Accordingly, it will be understood by those of ordinary skill in the art that various changes in form and details may be made without departing from the spirit and scope of the present invention as set forth in the following claims.

What is claimed is:

1. An organic light emitting display configured to be driven using a frame divided into a plurality of sub-frames, the organic light emitting display comprising:

a data driver configured to supply a plurality of data signals to output lines during a first period of one horizontal period of the sub-frame;

a scan driver configured to sequentially supply a scan signal to scan lines during a second period of the one horizontal period of the sub-frame;

a demultiplexer coupled to each output line, the demultiplexer being configured to supply the data signals to a plurality of data lines;

buffers configured to supply signals from the demultiplexers to the data lines, the buffers including PMOS transistors; and pixels disposed at intersections of the scan lines and the data lines, the pixels being configured to display images corresponding to the data signals, wherein each of the buffers includes:

an input unit coupled between a first power source and a second power source, the second power source outputting a voltage less than that of the first power source, the input unit configured to control a voltage of a first output terminal coupled to an output unit in accordance with a level of a voltage supplied to an input terminal, and the output unit coupled between the first power source and the second power source, and configured to output one voltage of the first and second power sources to a second output terminal in accordance with a voltage supplied to the first output terminal, wherein the input unit includes:

a seventh transistor coupled between the first output terminal and the first power source, and configured to be driven in accordance with the voltage supplied to the input terminal, a fifth transistor coupled between the first output terminal and the second power source, a sixth transistor coupled between a gate electrode of the fifth transistor and the second power source, and a second capacitor coupled between a gate electrode and a first electrode of the fifth transistor.

2. The organic light emitting display as claimed in claim 1, wherein the sixth transistor includes a gate electrode and a second electrode coupled with the second power source, and a first electrode coupled with a gate electrode of the fifth transistor.

3. The organic light emitting display as claimed in claim 2, wherein the output unit comprises:

a first transistor coupled between the first power source and the second output terminal, and including a gate electrode coupled with the first output terminal;

a second transistor coupled between the second output terminal and the second power source;

a third transistor coupled between a gate electrode and a first electrode of the second transistor, and including a gate electrode coupled to the first output terminal;

a fourth transistor coupled between the gate electrode of the second transistor and the second power source, and including a gate electrode coupled to the first input terminal; and a first capacitor coupled between the gate electrode and the first electrode of the second transistor.

4. The organic light emitting display as claimed in claim 2, wherein the output unit comprises:

a first transistor coupled between the first power source and the second output terminal, and including a gate electrode coupled to the first output terminal;

a second transistor coupled between the second output terminal and the second power source;

a fourth transistor including a gate electrode and a second electrode coupled to the second power source, and a first electrode coupled to a gate electrode of the second transistor; and a first capacitor coupled between a gate electrode and a first electrode of the second transistor.

5. The organic light emitting display as claimed in claim 2, wherein each of the seventh transistor, the fifth transistor, and the sixth transistor are PMOS transistors.

6. The organic light emitting display as claimed in claim 1, wherein the sixth transistor includes a gate electrode receiving a voltage having a polarity opposite to that of the voltage supplied to the first input terminal.

7. The organic light emitting display as claimed in claim 6, wherein the output unit comprises:

a first transistor coupled between the first power source and the second output terminal, and including a gate electrode coupled to the first output terminal;

a second transistor coupled between the second output terminal and the second power source;

a fourth transistor coupled between a gate electrode of the second transistor and the second power source, and including a gate electrode coupled to the first input terminal; and a first capacitor coupled between a gate electrode and a first electrode of the second transistor.

8. The organic light emitting display as claimed in claim 6, wherein each of the seventh transistor, the fifth transistor, and the sixth transistor are PMOS transistors.

9. The organic light emitting display as claimed in claim 1, further comprising:

a demultiplexer controller configured to supply a plurality of control signals not overlapping each other so that the plurality of data signals are divided into the plurality of data lines during the first period.

10. The organic light emitting display as claimed in claim 9, wherein each of the demultiplexers comprises a plurality of switching elements, which are turned-on at different times corresponding to the plurality of control signals.

11. The organic light emitting display as claimed in claim 1, wherein the data signals from the buffers are supplied to the pixels during the second period after the data signal is charged in a parasitic capacitor equivalently formed at each of the data lines.

12. An organic light emitting display configured to be driven using a frame divided into a plurality of sub-frames, the organic light emitting display comprising:

a data driver configured to supply a plurality of data signals to output lines during a first period of one horizontal period of the sub-frame;

a scan driver configured to sequentially supply a scan signal to scan lines during a second period of the one horizontal period of the sub-frame;

a demultiplexer coupled to each output line, the demultiplexer being configured to supply the data signals to a plurality of data lines;

buffers configured to supply signals from the demultiplexers to the data lines, the buffers including PMOS transistors; and pixels disposed at intersections of the scan lines and the data lines, the pixels being configured to display images corresponding to the data signals, wherein the output unit comprises:

a first transistor coupled between the first power source and the second output terminal, and including a gate electrode coupled to the first output terminal;

a second transistor coupled between the second output terminal and the second power source;

a fourth transistor including a first electrode coupled to a gate electrode of the second transistor and a second electrode coupled to the second power source; and a first capacitor coupled between a gate electrode and a first electrode of the second transistor.

13. The organic light emitting display as claimed in claim 12 wherein the fourth transistor includes a gate electrode coupled to the first input terminal.

14. The organic light emitting display as claimed in claim 13, wherein each of the first transistor, the second transistor, the third transistor and the fourth transistor are PMOS transistors.

15. The organic light emitting display as claimed in claim 12, wherein the fourth transistor includes a gate electrode coupled to the first input terminal.

16. The organic light emitting display as claimed in claim 15, wherein each of the first transistor, the second transistor, and the fourth transistor are PMOS transistors.

17. The organic light emitting display as claimed in claim 12, wherein:

the fourth transistor includes a gate electrode coupled to the second power source, and each of the first transistor, the second transistor, and the fourth transistor are PMOS transistors.

* * * * *